(12) United States Patent
Lin

(10) Patent No.: US 8,879,131 B2
(45) Date of Patent: Nov. 4, 2014

(54) SCAN PROJECTION DEVICE AND SCAN CONTROLLING METHOD THEREOF

(71) Applicant: Lite-On It Corporation, Taipei (TW)

(72) Inventor: Wen-Lung Lin, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/934,616

(22) Filed: Jul. 3, 2013

(65) Prior Publication Data

US 2014/0153064 A1   Jun. 5, 2014

(30) Foreign Application Priority Data

Dec. 4, 2012  (CN) .......................... 2012 1 0513569

(51) Int. Cl.
*H04N 1/04* (2006.01)
*H04N 1/024* (2006.01)

(52) U.S. Cl.
CPC ..................................... *H04N 1/024* (2013.01)
USPC ............. 358/474; 358/482; 345/207; 353/69; 359/238; 382/162

(58) Field of Classification Search
CPC .......... H04N 1/193; H04N 2201/0081; H04N 13/0296; H04N 1/00588; H04N 1/1013; H04N 2201/044; H04N 1/00082; H04N 1/00087; H04N 5/232; H04N 1/00034; H04N 1/00774
USPC ................................ 345/207; 353/69; 359/238
See application file for complete search history.

(56) References Cited

U.S. PATENT DOCUMENTS

| | | | | |
|---|---|---|---|---|
| 6,801,342 | B1 * | 10/2004 | Shinozaki | 358/461 |
| 7,102,797 | B2 * | 9/2006 | Sakai | 358/461 |
| 7,133,165 | B2 * | 11/2006 | Yamada et al. | 358/474 |
| 7,289,240 | B2 * | 10/2007 | Park | 358/1.2 |
| 7,551,328 | B2 * | 6/2009 | Kondo et al. | 358/474 |
| 7,551,330 | B2 * | 6/2009 | Yamada et al. | 358/474 |
| 7,834,867 | B2 * | 11/2010 | Sprague et al. | 345/204 |
| 7,972,014 | B2 * | 7/2011 | Hung et al. | 353/69 |
| 8,057,052 | B2 * | 11/2011 | Nishigaki et al. | 353/85 |
| 8,059,314 | B2 * | 11/2011 | Ishido | 358/474 |
| 8,235,533 | B2 * | 8/2012 | Hudman et al. | 353/69 |
| 8,355,013 | B2 * | 1/2013 | Sprague et al. | 345/204 |
| 8,384,625 | B2 * | 2/2013 | Hajjar et al. | 345/75.1 |
| 8,395,633 | B2 * | 3/2013 | Kurozuka | 345/545 |
| 8,432,586 | B2 * | 4/2013 | Hamano et al. | 358/505 |
| 8,503,047 | B2 * | 8/2013 | Shirado | 358/475 |
| 8,514,460 | B2 * | 8/2013 | Miyagawa | 358/448 |
| 8,630,026 | B2 * | 1/2014 | Hayakawa et al. | 358/474 |
| 8,643,911 | B2 * | 2/2014 | Maeda | 358/474 |
| 2011/0032583 | A1 * | 2/2011 | Nishida et al. | 358/474 |
| 2011/0074660 | A1 * | 3/2011 | Hajjar et al. | 345/75.1 |

* cited by examiner

*Primary Examiner* — Negussie Worku
(74) *Attorney, Agent, or Firm* — Rabin & Berdo, P.C.

(57) ABSTRACT

A scan projection device and a controlling method are projected. The scan projection device comprises a light source module, a scanning module and a scan driving device. The light source module is for providing an image beam. The scanning module has a first direction scanning frequency and a second direction scanning frequency. The first direction scanning frequency is 2N+1 times of the second direction scanning frequency, wherein N is an integer. The scanning module is for projecting the image beam towards a particular direction and scanning a projection surface. The scan driving device controls the scanning module to scan the projection surface back and forth along a scan trace at the first direction scanning frequency and the second direction scanning frequency.

10 Claims, 3 Drawing Sheets

SCAN PROJECTION DEVICE AND SCAN CONTROLLING METHOD THEREOF

This application claims the benefit of People's Republic of China application Serial No. 201210513569.9, filed Dec. 4, 2012, the subject matter of which is incorporated herein by reference.

BACKGROUND OF THE INVENTION

1. Field of the Invention

The invention relates in general to a projection device and a controlling method, and more particularly to a scan projection device and a scan controlling method.

2. Description of the Related Art

Conventional projection technology uses pixel array for projecting an image. Along with the advance in projection technology, a new projection device which projects an image by way of scanning has been provided. The scan projection device uses a micro-electro-mechanical system (MEMS) mirror swinging in two dimensions to drive the image beam to scan a projection surface by way of such as raster scanning or Lissajous scanning, and produces an image through the persistence of vision perceived by human eyes.

In general, the MEMS mirror swings in two dimensional directions, such as a horizontal direction and a vertical direction. The swing frequency is defined as the resonance frequency of the MEMS mirror. For example, the horizontal swing frequency is 18 KHz, and the vertical scanning frequency is 60 Hz. Normally, the vertical resonance frequency of the MEMS mirror is about 10 Hz to 1000 Hz. That is, unless the inputted control signal is a precise mono frequency wave such as a 60 Hz sine wave, otherwise all harmonic waves of the vertical control signal whose frequency ranging between 10 Hz to 1000 Hz will make the MEMS mirror generate a corresponding reaction. Consequently, the MEMS mirror will have non-uniform speed in the vertical direction and horizontal bright lines will occur to the projection image.

To resolve the above problems, the industries currently suppress the phenomenon of horizontal bright lines by way of feedback control, which requires many additional controlling circuits, not only increasing cost but also decreasing reliability.

SUMMARY OF THE INVENTION

The invention is directed to a scan projection device and a scan controlling method which eliminates the phenomenon of horizontal bright lines through the design of reverse scan along a scan trace and the design of the scanning frequencies.

According to an embodiment of the present invention, a controlling method of a scan projection device. The scan projection device comprises a scanning module. The controlling method of the scan projection device comprises the following steps of: controlling a first direction scanning frequency of the scanning module; controlling a second direction scanning frequency of the scanning module, wherein the first direction scanning frequency is 2N+1 times of the second direction scanning frequency, and N is an integer; and scanning a projection surface back and forth along the scan trace at the first direction scanning frequency and the second direction scanning frequency.

According to another embodiment of the present invention, a scan projection device is provided. The scan projection device comprises a light source module, a scanning module and a scan driving device. The light source module is for providing an image beam. The scanning module has a first direction scanning frequency and a second direction scanning frequency. The first direction scanning frequency is 2N+1 times of the second direction scanning frequency, wherein N is an integer. The scanning module is for projecting the image beam towards a particular direction and scanning a projection surface. The scan driving device controls the scanning module to scan the projection surface back and forth along the scan trace at the first direction scanning frequency and the second direction scanning frequency.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
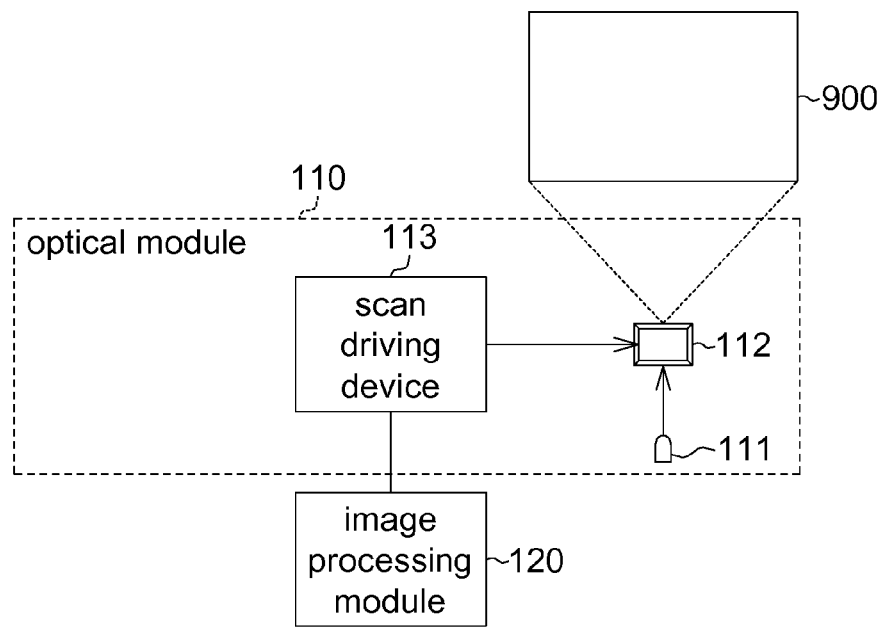
FIG. 1 shows a schematic diagram of a scan projection device according to an embodiment of the invention.

Referring to FIG. 1, a schematic diagram of a scan projection device 100 according to an embodiment of the invention is shown. The scan projection device 100 comprises an optical module 110 and an image processing module 120. The optical module 110 comprises a light source module 111, a scanning module 112 and a scan driving device 113.

The light source module 111 is for providing an image beam, which comprises at least a laser light source (not illustrated). The laser light source may emit such as a He—Ne laser light, a $CO_2$ laser light or a halogenated inert gas light. The laser light source may provide a mono color laser light or a multi-color laser light such as red, green and blue laser light. The light source module 111 further comprises an optical assembly (not illustrated) for projecting the laser light emitted by the laser light source to the scanning module 112.

Figure 2:
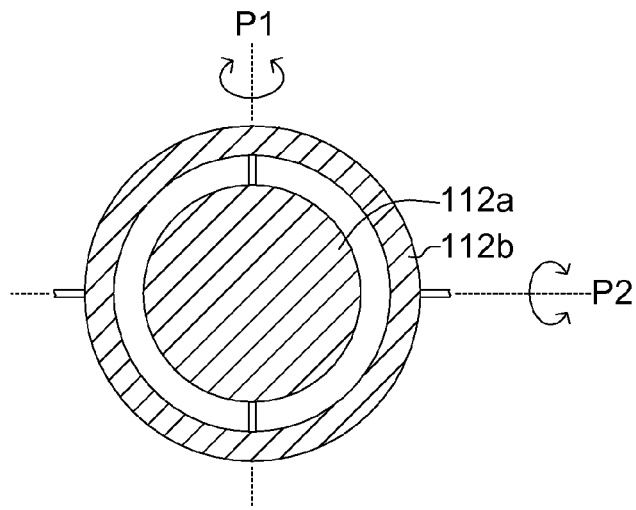
FIG. 2 shows a schematic diagram of a scanning module according to an embodiment of the invention.

The scanning module 112 can be a micro-electro-mechanical system (MEMS) mirror. Referring to FIG. 2, a schematic diagram of a scanning module 112 according to an embodiment of the invention is shown. The scanning module 112 comprises a reflective mirror 112a and a frame 112b. The reflective mirror 112a may rotate around the first axis P1 to drive the image beam to scan in a first direction, such as a horizontal direction. The frame 112b may rotate around the second axis P2 to drive the reflective mirror 112a to swing in a second direction, such as a vertical direction, such that the image beam scans in a second direction, such as a vertical direction.

In the present embodiment, the scanning module 112 drives the image beam to scan in the first direction and the second direction at different swing frequencies. In other words, the first direction scanning frequency is different from the second direction scanning frequency.

Figure 4:
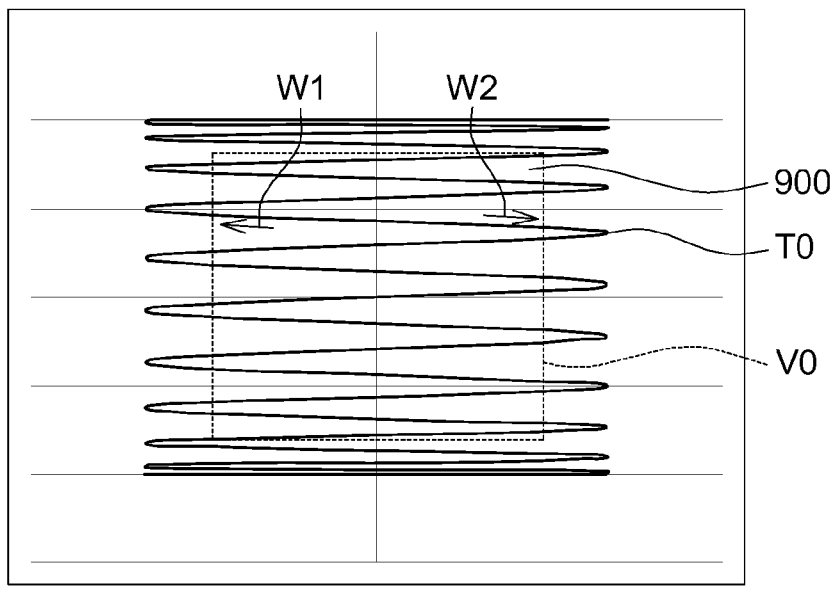
FIG. 4 shows a schematic diagram of the scanning module driving the image beam to scan the projection surface back and forth.

As indicated in FIG. 4, the scan driving device 113 is for controlling the scanning module 112 to drive the image beam to scan a projection surface 900 along a scan trace T0 in the first direction and the second direction, such as a horizontal direction and a vertical direction. In the embodiment of FIG. 4, the horizontal direction scanning frequency is higher than the vertical direction scanning frequency.

The image processing module 120 is for controlling the optical module 110 according to an image signal. The scan driving device 113 and the image processing module 120 are such as a chip, a firmware circuit or a storage medium storing several programming codes.

The scan projection device 100 of the present embodiment eliminates the phenomenon of horizontal bright lines through the design of reverse scan along a scan trace and the design of the scanning frequencies. The controlling method of the scan projection device 100 of the present embodiment is exemplified by a flowchart below.

Figure 3:
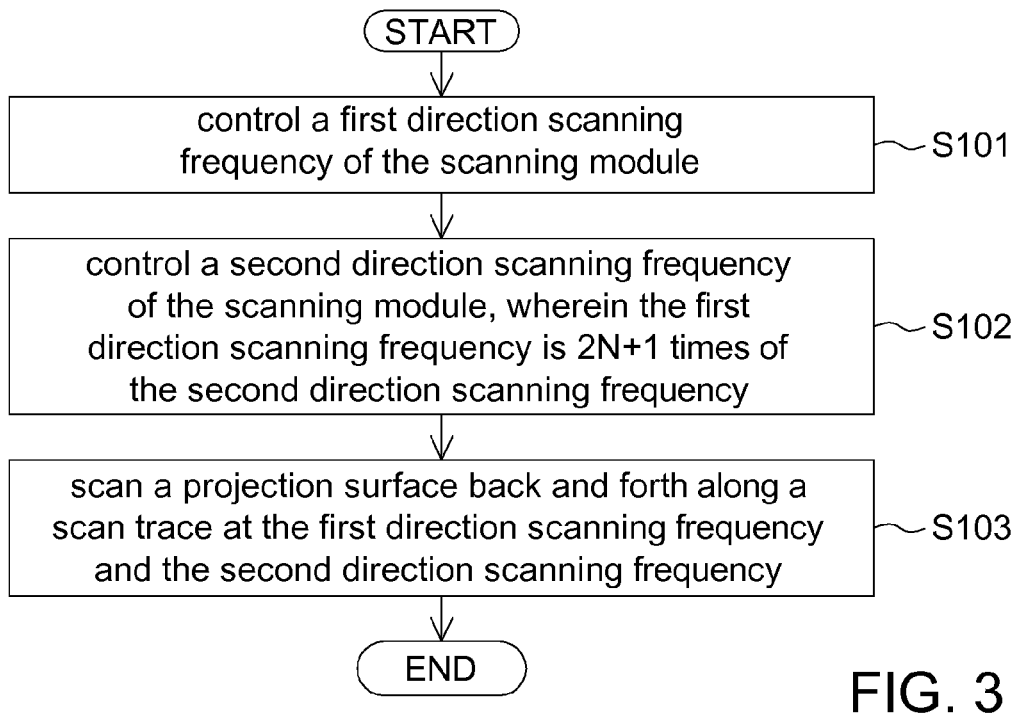
FIG. 3 shows a flowchart of a controlling method of a scan projection device according to an embodiment of the invention.

Referring to FIG. 3, a flowchart of a controlling method of the scan projection device 100 according to an embodiment of the invention is shown. The flowchart of FIG. 3 is exemplified by the scan projection device 100 of FIG. 1, but the invention is not limited thereto. In step S101, the scan driving device 113 controls a first direction scanning frequency f1 of the scanning module 112.

For exemplary purpose, let the display format be the 480P video display format, the first direction be the horizontal direction, the vertical resolution of the progressive scanning be 480, and the horizontal scanning frequency f1 be 18 KHz. In the present embodiment, the first direction scanning frequency f1 is a sine wave frequency, and the first direction scanning frequency f1 is a fixed mono frequency.

In step S102, the scan driving device 113 controls a second direction scanning frequency f2 of the scanning module 112, wherein the first direction scanning frequency f1 is 2N+1 times of the second direction scanning frequency f2, and N is an integer. Let the display format be the 480P video display format, the first direction be the horizontal direction, and the second direction be the vertical direction. When the horizontal scanning frequency f1 is such as 18 KHz and N is such as 10, the vertical scanning frequency f2 is such as 857 Hz. Also, when the horizontal scanning frequency f1 is such as 18 KHz and N is such as 250, the vertical scanning frequency f2 is such as 36 Hz.

In the present embodiment, the second direction scanning frequency f2 is a sine wave frequency, and the second direction scanning frequency f2 is a fixed mono frequency.

In step S103, the scan driving device 113 drives an image beam of the scanning module 112 to scan the projection surface 900 back and forth along a scan trace at the first direction scanning frequency f1 and the second direction scanning frequency f2. Referring to FIG. 4, a schematic diagram of the scanning module 112 driving the image beam to scan the projection surface 900 back and forth is shown. The scan driving device 113 scans the projection surface 900 twice within a second direction scan period. Let the first direction be the horizontal direction, and the second direction be the vertical direction for example. Within a vertical scan period, when the scan driving device 113 performs a first scan, the scan driving device 113 scans the projection surface 900 along a scan trace T0 towards a direction W1 in a top down manner. When the scan driving device 113 performs the second scan, the scan driving device 113 scans the projection surface 900 along the scan trace T0 towards an opposite direction W2 in a bottom up manner.

Figure 5:
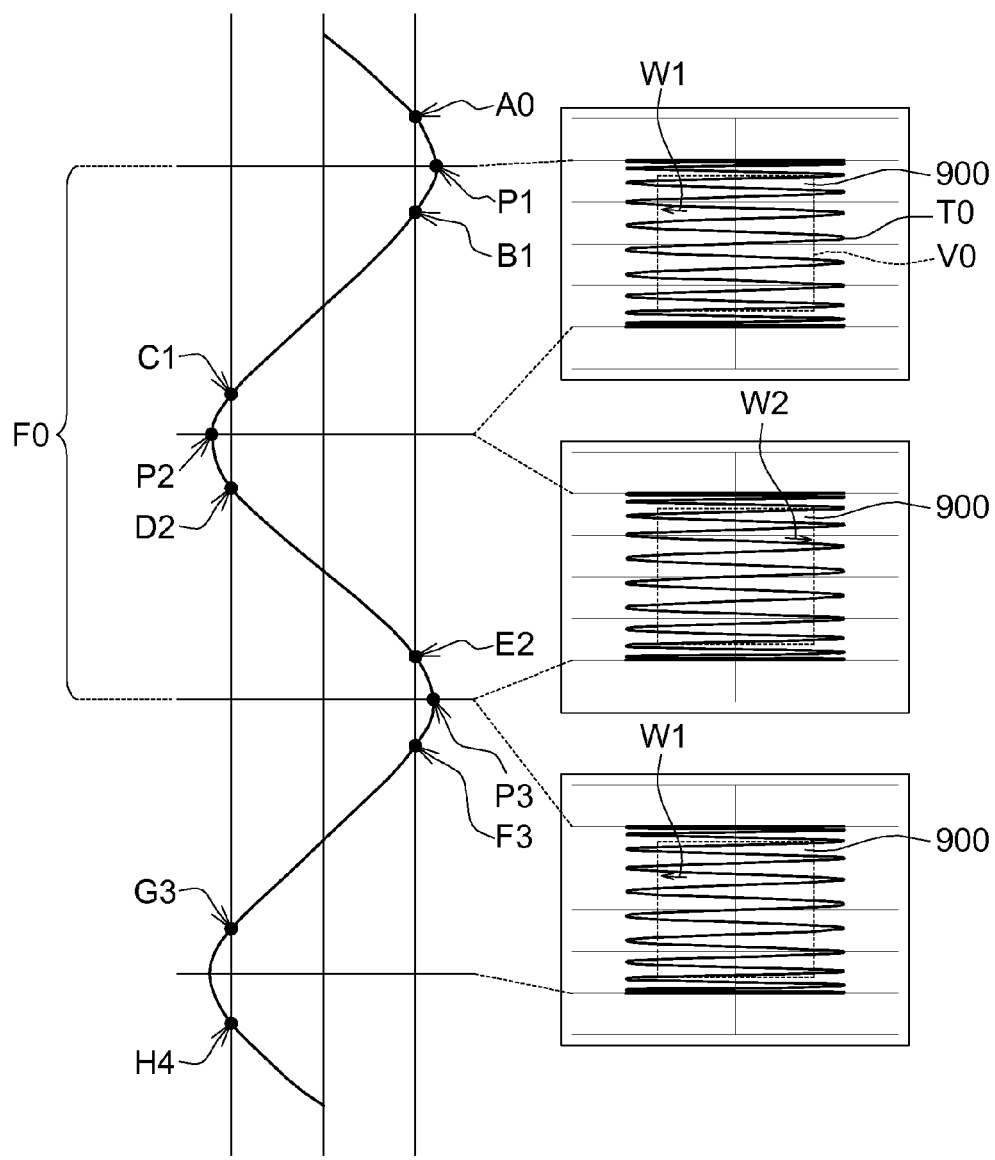
FIG. 5 shows a relationship diagram of a scan trace vs. a second direction scan control signal.

Referring to FIG. 5, a relationship diagram of a scan trace T0 vs. the control signal in the second direction is shown. Let N be equal to 10. Within a second direction scan period F0, there are 21 (that is, 2N+1) first direction scan periods. The period from point P1 to point P2 is the first scan within the second direction scan period F0 and there are 10.5 first direction scan periods scanned along the scan trace T0 towards the direction W1. The period from point P2 to point P3 is the second scan within the second direction scan period F0 and there are 10.5 first direction scan periods scanned along the scan trace T0 towards the opposite direction W2. The two times of scanning within one second direction scan period F0 have 21 first direction scan periods.

The above scanning process is controlled by a mono frequency signal rather than a large area total harmonic signal, hence eliminating the phenomenon of horizontal bright lines. Moreover, the method of the invention can eliminate the phenomenon of horizontal bright lines without adding any feedback control circuits, hence avoiding the increase in cost and the decrease in reliability.

As indicated in FIGS. 4 to 5, the second direction scan control signal is a sine wave. In the peak and the valley areas, the scanning speed is relatively slow, the first direction scan periods are highly concentrated, and the scan line has a higher density. Therefore, the image processing module 120 can capture and use the central part of the scan region as a visible region V0, such that the scan line is uniformly distributed in the visible region V0.

As indicated in FIG. 5, in the second direction scan control signal, the image processing module 120 capture the scan region from point B1 to point C1, the scan region from point D2 to point E2, and the scan region from point F3 to point G3 as the visible regions V0. The scan region from point A0 to point B1, the scan region from point C1 to point D2, the scan region from point E2 to point F3 and the scan region from point G3 to point H4 are located outside the visible regions V0.

As disclosed above, the scan projection device 100 and the controlling method of the present embodiment can eliminate the phenomenon of horizontal bright lines through the design of reverse scan along a scan trace and the design of the scanning frequencies without adding any feedback control circuits, hence avoiding the increase in cost and the decrease in reliability.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A controlling method of a scan projection device, wherein the scan projection device comprises a scanning module for reflecting and driving an image beam to scan on a projection surface, and the controlling method comprises:

controlling the scanning module to drive the image beam to scan on the projection surface along a first direction at a first direction scanning frequency and along a second direction at a second direction scanning frequency, wherein the first direction scanning frequency is 2N+1 times of the second direction scanning frequency, and N is an integer; and controlling the scanning module to drive the image beam to scan on the projection surface back and forth along a scan trace.

2. The controlling method according to claim 1, wherein the first direction scanning frequency is a sine wave frequency.

3. The controlling method according to claim 1, wherein the second direction scanning frequency is a sine wave frequency.

4. The controlling method of according to claim 1, wherein the first direction scanning frequency is a mono frequency.

5. The controlling method of according to claim 1, wherein the second direction scanning frequency is a mono frequency.

6. The controlling method of according to claim 1, wherein the scanning module drives the image beam to scan on the projection surface along the scan trace forwardly and reversely within a scan period of the second direction scanning frequency.

7. A scan projection device, comprising
a light source module for providing an image beam;
a scanning module for reflecting and driving the image beam to scan on a projection surface along a first direction at a first direction scanning frequency and along a second direction at a second direction scanning frequency, wherein the first direction scanning frequency is 2N+1 times of the second direction scanning frequency, and N is an integer; and
a scan driving device for controlling the scanning module to drive the image beam to scan on the projection surface back and forth along a scan trace.

8. The scan projection device according to claim 7, wherein the first direction scanning frequency and the second direction scanning frequency both are a sine wave frequency.

9. The scan projection device according to claim 7, wherein the first direction scanning frequency and the second direction scanning frequency both are a mono frequency.

10. The scan projection device according to claim 7, wherein within a scan period of the second direction scanning frequency, the scan driving device controls the scanning module to drive the image beam to scan on the projection surface along the scan trace forwardly and reversely.

* * * * *